United States Patent [19]

Schilling

[11] Patent Number: 5,381,852
[45] Date of Patent: Jan. 17, 1995

[54] PROCESS FOR CASTING A MOTOR VEHICLE WHEEL FROM METAL, AND A MOTOR VEHICLE WHEEL PRODUCED BY SUCH PROCESS

[75] Inventor: Herbert Schilling, Erftstadt, Germany

[73] Assignee: EB Bruhl Aluminiumtechnik GmbH, Bruhl, Germany

[21] Appl. No.: 39,968

[22] Filed: Mar. 30, 1993

[30] Foreign Application Priority Data

Apr. 3, 1992 [DE] Germany .................. 4211130

[51] Int. Cl.6 .............. B22C 9/10; B22C 9/28
[52] U.S. Cl. .................... 164/137; 164/28; 164/29
[58] Field of Search ............ 164/137, 27, 28, 30, 164/31, 32, 364, 365, 368

[56] References Cited

U.S. PATENT DOCUMENTS

| | | | |
|---|---|---|---|
| 524,169 | 8/1894 | Geyer | 164/31 |
| 717,631 | 1/1903 | Shaw | 164/368 |
| 1,066,431 | 7/1913 | Johnson | 164/31 |
| 1,478,494 | 12/1923 | Walther | 164/32 |
| 1,489,245 | 4/1924 | Hanna | 164/28 |
| 2,838,816 | 6/1958 | Strom | 22/128 |
| 2,841,838 | 7/1958 | Covitt | 164/137 |
| 2,919,479 | 1/1960 | Menningen | 164/364 |
| 3,554,271 | 1/1971 | Goss | 164/137 |
| 3,848,654 | 11/1974 | Boyle et al. | 164/137 |
| 4,809,763 | 3/1989 | Schilling | 164/28 |

Primary Examiner—P. Austin Bradley
Assistant Examiner—Erik R. Puknys
Attorney, Agent, or Firm—Perman & Green

[57] ABSTRACT

The invention relates to a process for casting novel motor vehicle wheels from metal, such as from an aluminum alloy, which wheels have a rim ring and a hub part connected by supporting radial elements. According to the present process the casting mold is formed by a plurality of molded core parts that are mainly ring- and/or disk-shaped and which are axially assembled while still attached to their mold sections and are centered relative to each other by the relative adjustment of the mold sections. The parting plane of the core parts runs perpendicularly to the wheel axis. This permits one-piece wheels to be cast with great accuracy, which wheels have few, if any, visible mold seams.

3 Claims, 3 Drawing Sheets

PROCESS FOR CASTING A MOTOR VEHICLE WHEEL FROM METAL, AND A MOTOR VEHICLE WHEEL PRODUCED BY SUCH PROCESS

BACKGROUND OF THE INVENTION

1. Field of the Invention

The present invention relates to a process for casting a motor vehicle wheel from metal, especially from an aluminum alloy, said wheel having a rim ring and a hub part connected thereto by supporting radial elements.

2. Description of State of the Art

Because of the special shape of the rim well, motor vehicle wheels cast from an aluminum alloy are manufactured in such fashion that a bi- or multipartite radially-openable mold is used for forming the rim well section. However, the precision that can be achieved in this manner as regards true-running, uniform wall thickness, etc., make it necessary for the cast blank to be finished by a costly machining procedure. All additional elements to be mounted, such as fan rings, trim coverings, especially trim coverings for purposes of air guidance for example, have to be manufactured as separate elements and then mounted on the cast wheel body, such as by bolting. Then, after machining and assembly of the additional parts, additional finishing is required to balance the finished motor vehicle wheel.

SUMMARY OF THE INVENTION

The main objective of the present invention is to provide an improved process of the aforementioned type which permits casting a motor vehicle wheel with high accuracy. This objective is achieved according to the present invention by the use of a casting mold which is formed of a plurality of core parts, said parts being fitted together axially and being essentially ring- and/or disk-shaped, the parting plane of said parts being directed essentially perpendicularly to the wheel axis. This process has the advantage that the division of the casting mold into a plurality of essentially ring- and/or disk-shaped core parts, fitted together axially, produces a reliable true-running precision and uniform wall thicknesses by virtue of the ability to center the mold coreparts in the axial direction. [In this connection a process is advantageously used in which the individual parts of the casting mold are made of a nonmetallic mold material. As is known from the core molding technology, cores for casting iron are manufactured from a flowable molding material which cures when cold.] The high precision is possible because the individual core parts are each shaped individually in a core mold composed of at least two mold halves or sections, and after each molding process is completed for the individual core parts, the respective mold is opened so that the respective core part remains connected with a mold section, and then the individual core parts are fitted together for the casting mold. The mold parts, still connected to their respective mold sections, can be centered by specific relative movements of the mold sections. Since the centering of the individual core parts to be fitted together is not carried out with the core parts themselves but rather with their mold sections, in other words machine-related parts, a very exact fit can be achieved in this manner. In this process, a core pare is defined as a basic core part which, with its corresponding mold section as the support and centering element, remains connected therewith until all of the fitting operations required for completely assembling the casting mold, have been completed. [Only then is the complete casting mold, fitted together in this manner, used to form a casting.] Since, in this process, the geometric arrangement required for fitting the mold parts together, and the resultant relative movement of the assembled core parts can take place only in the direction of the wheel axis during manufacture of the motor vehicle wheels, the result is a high level of precision for the assembled parts, something which cannot be achieved after complete removal of the individual core parts from their mold sections and separate assembly thereof.

Advantageous use is made of the fact that in this cold molding process, in which curing of the binder of the molding material or the core sand is carried out not by temperature but by chemical-catalytic processes, the mold parts of the individual molding machines have temperatures that are practically equal. Therefore, no differences in dimensions of the individual mold parts from one another can occur as a result of thermal expansion, so that the individual mold sections can be provided with guide and centering surfaces that can be aligned with one another to produce high molding accuracy so that the finished casting has few, if any, visible mold seams. The high molding accuracy therefore does not require that the individual parts of the casting mold be made new in each case and assembled with high accuracy. This makes it possible to cast a motor vehicle wheel composed of the rim ring, hub part, and supporting radial elements in one piece. The supporting radial elements can be made completely disk-shaped and/or spoke-shaped. The molding and casting process according to the invention also makes it possible to provide supporting radial elements in spoke form, which are designed as fan blades, i.e. they are inclined relative to the hub plane in the axial direction. The core parts required for this purpose—two core parts will suffice depending on the design—are then made essentially disk-shaped, with the surfaces of these two core parts facing one another having additional bumps or notches so that the designer is given a wide range of freedom in designing the shapes of the supporting radial elements. Thus in the process according to the invention it is also possible to manufacture ventilating motor vehicle wheels cast in one piece.

The invention also relates to motor vehicle wheels made of metal, especially of an aluminum alloy, with a rim ring and a hub part connected by supporting radial elements, cast using the method according to the invention.

Motor vehicle wheels according to the invention are characterized by the fact that the rim ring, the supporting radial elements, and the hub part are cast in one piece.

In a preferred embodiment of the invention, provision is made for the supporting radial elements to be at least partially spoke-shaped and designed as fan blades. This eliminates the separate steps of manufacture and assembly of an additional ring of fan blades.

In another embodiment of the motor vehicle wheel according to the invention, provision is made for the supporting radial elements, viewed in the circumferential direction, to be arranged in two parallel rows. This design is possible both for radial elements that are essentially disk-shaped and also for supporting radial elements that are essentially spoke-shaped. The special advantage of this design resides in the fact that the connection between the rim ring and the hub part can be made essentially "double-walled," so that a much higher dimensional stability is achieved for such motor vehicle wheels, something which is particularly important for motor vehicle wheels fitted with so-called wide tires.

In another embodiment of the invention, provision is made for the supporting radial elements to be made disk-and/or ring-shaped over at least a portion of their radial extent and connected with one another by fan blades. This arrangement has the advantage that in addition to the increased dimensional stability, the fanning performance can be influenced favorably, since the supporting radial elements in this area of the motor vehicle wheel can be made like a gyro fan wheel in the shape of a so-called channel wheel, whereby the special advantage is that the assembly can be made in one piece.

The invention will now be described in greater detail with reference to schematic diagrams showing embodiments.

DISCUSSION OF THE DRAWINGS

DETAILED DISCUSSION

Figure 1:
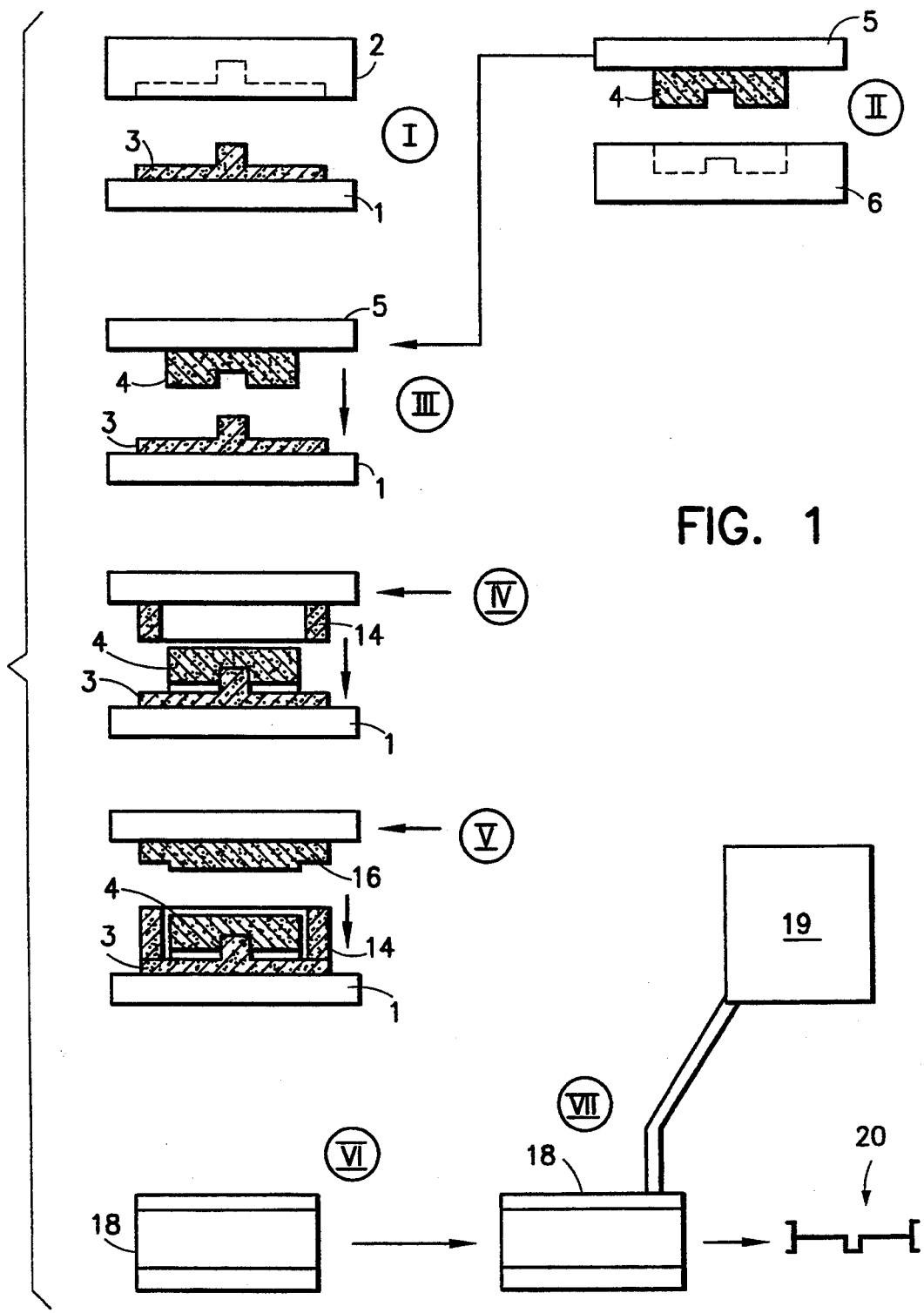
FIG. 1 illustrates the present process in the form of a flowchart.
Figure 2:
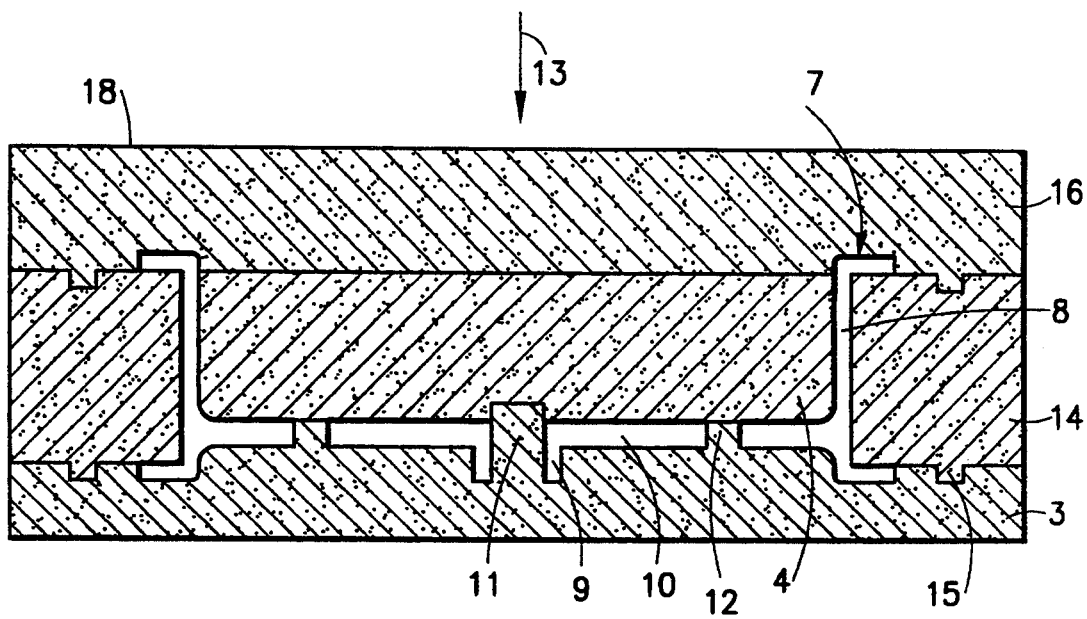
FIG. 2 is a vertical cross-section view of a casting mold assembly of rings and disks.

A casting mold for a motor vehicle wheel must be assembled from a plurality of essentially ring- and/or disk-shaped core parts because of the many undercuts, made from core molding sand. The individual core parts of the mold are manufactured by special core molding machines and then fitted together. The flowchart in FIG. 1 shows the process in simplified form for assembling a casting mold composed of only four core parts. An actual mold assembly for manufacturing a cast motor vehicle wheel is shown in FIG. 2. In the process illustrated by FIG. 1, in a core molding machine I consisting of a mold box made of two mating mold parts or sections 1 and 2, a first molded core part 3, is produced in the usual fashion, for example using the cold box process, from a suitable curable mold sand composition with chemical-catalytic curing. Another mold core part 4, designed to be assembled with core part 3, is molded in a second core molding machine II having a core mold composed of a mold section 5 and a mating mold section 6. As soon as the two core parts 3 and 4 have been "shot," the core molds open, and in core molding machine 1 molded core part 3 remains in mold section 1 and is brought to a first assembly station III. In a subsequent process step, the corresponding molded core part 4 is moved from core molding machine II, said part still being connected with the mold section 5 after the mold box opens, to assembly station III, positioned, and then lowered onto molded core part 3, or the core part 3 is raised, so that both core parts 3 and 4 are assembled.

Similarly, molded core parts 14 and 16 are supplied on mold sections from core molding machines IV and V, not shown in detail, and as shown in the drawing, are placed sequentially on the already assembled molded core parts 3 and 4 to form the complete casting mold 18.

At another station VI the finished casting mold 18 is released from mold section 1, which has served for centering and guidance during the entire process, and carried to casting station VII where it is filled with molten metal alloy from station 19 and then cast. After cooling, the casting mold is destroyed and the finished motor vehicle wheel 20 is removed. Because of the high fitting precision, a motor vehicle wheel manufactured according to this process has practically no visible mold seams.

As illustrated by the sequence of steps explained above, with reference to FIG. 1, for building up a casting mold 18, the casting mold 18 shown complete in FIG. 2 in axial section can be assembled by exclusively axial assembly of ring- and/or disk-shaped core parts. The basic contour of a motor vehicle wheel 20, shown in simplified form, is the result of the dimensions and contour of the mold cavity 7 of the mold 18, which is shown completely assembled in FIG. 2. The motor vehicle wheel 20 being cast consists essentially of a rim ring 8 and a hub part 9 connected to ring 8 by a supporting radial element 10 in the form of a solid disk or in the form of a plurality of radial spokes or blades.

On the basis of the process schematically illustrated in FIG. 1, the molded ring- core part 14 is placed on basic molded core part 3, said part 14 essentially determining the contour of the rim well forming the rim ring 8. Core parts 3 and 14 are provided with mating pins and/or recesses 15 aligned with one another, which are forced firmly into one another in the axial direction (arrow 13 in FIG. 2) during assembly, so that alignment and centering of both mold sections with respect to one another in the fitting operation is not effected by the pins and/or recesses 15 in the two core parts but exclusively by the mold sections carrying the corresponding core parts, the mold sections being guided on the corresponding machine frame while still connected with the core parts.

An essentially disk-shaped core part 4 is positioned on basic core part 3, said part 4 being centered by means of a corresponding centering projection or pin 11 on core part 3 and defining essentially the mold cavity for the supporting radial element 10 as well as the inside contour of rim ring 8. The spoke gaps or ventilating holes in supporting element 10, as shown in the embodiment illustrated here, are formed by matching projections or spacers 12. The two core parts 3 and 4 are fitted together in the direction of the wheel axis (arrow 13), with the centering of the two core parts with respect to one another not being performed by the core parts themselves but by the mold sections 1 and 5 that are still connected with the core parts during the assembly operation, said mold sections being guided exactly with respect to one another in a suitable machine frame. The ring shaped core part 14 is similarly applied and centered.

The mold is then sealed off completely by a disk-shaped core part 16.

FIG. 2 shows a casting mold 18 of this kind in simplified form. For example the contour of the rim well makes it necessary in practice to divide ring-shaped core part 14 into at least two partial rings. This is especially true of disk-shaped core part 4 for forming the interior.

Figure 3:
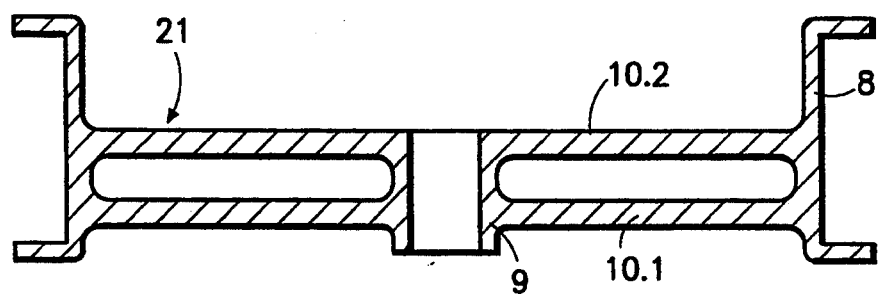
FIG. 3 is a cross-section view of a motor vehicle wheel cast according to the present process and having a double-walled supporting radial element.

The explanations with reference to FIG. 2 indicate that this process also allows casting a motor vehicle wheel 21 in one piece, which, as shown in a diagram in FIG. 3, has a rim ring 8 connected with hub part 9 by two supporting radial elements 10.1 and 10.2 running parallel and at a distance apart from one another. The embodiment shown in FIG. 3 is based on a mold in which the supporting radial elements 10.1 and 10.2 are made spoke-shaped, with the two parallel rows of spokes being staggered with respect to one another. In the arrangement of corresponding openings which serve simultaneously for centering and mounting a suitably disk-shaped core part, supporting radial elements 10.1 and 10.2 can also be made disk-shaped, so that a complicated structural element of this kind can be manufactured as a one-piece casting.

Figure 4:
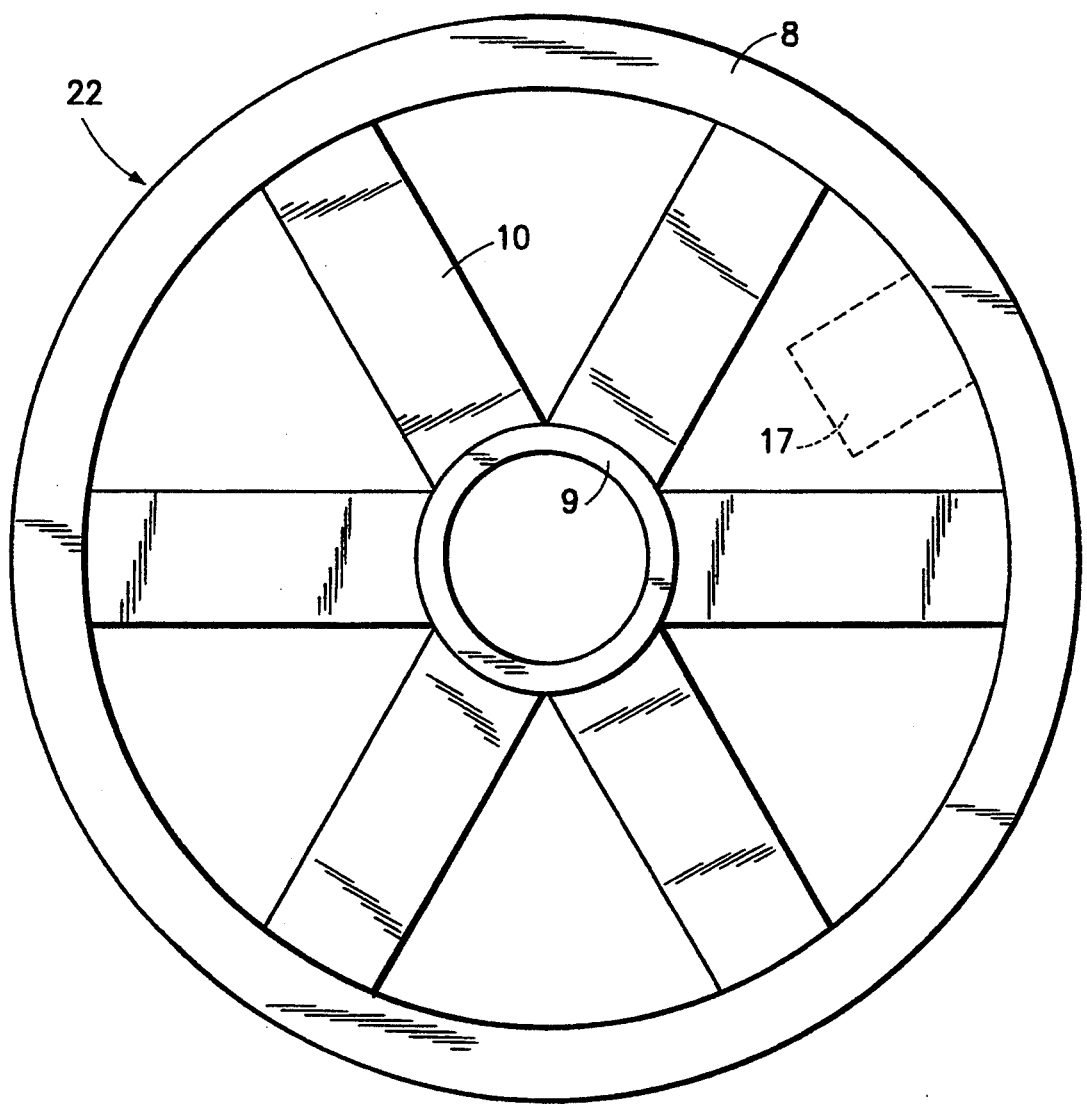
FIG. 4 is a plan view of a motor vehicle wheel according to the invention, having a spoke-shaped radial supporting element.
Figure 5:
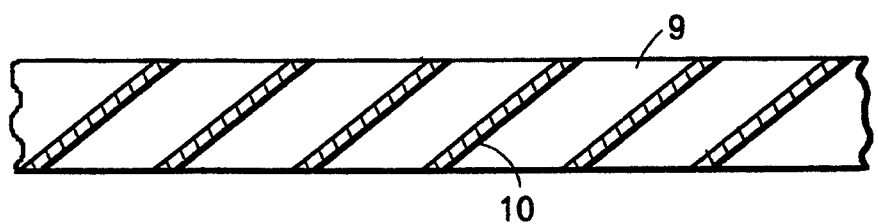
FIG. 5 is a planar illustration of the hub part of the embodiment according to FIG. 4, sectioned through the radial elements, if the hub part was cut and laid flat.

With reference to FIGS. 4 and 5, a motor vehicle wheel 22 is shown in which spoke-shaped radial elements 10 are provided but which are aligned at an angle to the plane of the wheel, as shown in the cut-away planar illustration of hub part 9 in FIG. 5. In a wheel of this type, supporting spoke-shaped radial elements 10 simultaneously serve as fan blades for forced ventilation of the disk brake associated with the motor vehicle wheel.

FIGS. 2 to 5 of the present description indicate clearly that, for example on the basis of a wheel shape as in FIG. 3, a wide variety of designs and combinations are possible. Thus it is possible, for example in forming a casting according to FIG. 3, to make the supporting radial element 10.2 annular, whereupon the ring directly abuts rim ring 8 with its outer edge, while with its inner edge it terminates at a distance from hub part 9. Supporting radial element 10.1 is connected with appropriate reversal on hub part 9 and terminates at a distance from the inside surface of rim ring 8. Both disk- and ring-shaped supporting radial elements are then firmly connected with one another by suitable axially directed ribs serving as fan blades, with these radial ribs also simultaneously being connected by their ends with the outer surface of hub part 9 and the inner surface of rim ring 8, so that the result is a motor vehicle wheel cast in one piece whose supporting radial element is simultaneously designed as a fan wheel.

The process according to the invention also makes it possible to manufacture a motor vehicle wheel with fan blades in such fashion that only one disk- or ring-shaped radial element 10 is provided which is cast in one piece with radially-directed rotor blades together with hub part 9 and rim ring 8, on which a cover, serving simultaneously as a wheel cover, is mounted from the outside in a second work step, said cover then making the part of the motor vehicle wheel serving as the fan wheel into a so-called channel wheel. Since the cover to be mounted can be cast according to the process of the invention, for a motor vehicle wheel assembled in this fashion, high precision and a wide variety of design opportunities are possible even for the wheel area serving as the fan. In addition the mounted cover can even be provided with suitable rib-shaped projections that serve as fan blades.

FIG. 4 also shows that, in addition to the spoke-shaped supporting radial elements designed as fan blades, it is also possible to cast on the inside of the rim ring additional fan elements 17 that project freely from the hub, as illustrated by the dashed lines in FIG. 4 for an element of this type.

In the present description, the term core according to this invention means formed core parts which constitute, when completely assembled, the complete casting form for the wheel. The present core parts are made from material typically used for cores in casting processes, and are destroyed after a single use, with the material being recycled.

Also, the accurate alignment and spacing between the present core parts is guaranteed by means integral with the mold sections, not by the projections and recesses of the core parts. These are only present to form the mold cavity, e.g., the projections form the interior of the hub and the intermediate spaces between the spokes or fan blades or the apertures within the parallel walls, necessary to remove the core material from therebetween.

Also, while the parting planes are defined as being generally perpendicular, it is within the scope of the invention that the parting plane may be slightly conical or may be comprised of different stepped angular faces.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. Process for casting a one-piece motor vehicle wheel from molten metal, said wheel comprising a rim ring portion and a hub portion connected thereto by means of a supporting radial portion, said process comprising the steps of individually molding a plurality of non-metallic mold core parts including bottom, central and top disk shaped mold core parts and a peripheral ring-shaped mold core part, each on its own mold section, sequentially and axially assembling and centering said central, top and peripheral mold core parts to said bottom mold core part while each of said parts is still attached to its mold section, the centering of each of said mold core parts being accomplished by adjusting the relative positions of the mold section to which the bottom mold core part is attached and the mold sections attached to the mold core parts being assembled thereto, so that the parting planes between contacting areas of said mold core parts run generally perpendicular to the wheel axis, to form a mold consisting of said non-metallic mold core parts and enclosing a mold cavity for casting an integral motor vehicle wheel; filling said mold cavity with molten casting metal, such as aluminum alloy, cooling, and removing the cast one-piece motor vehicle wheel.

2. Process according to claim 1 which comprises molding bottom and central mold core parts to have mating projections and recesses having accurate alignment and spacing therebetween to provide the hub and the supporting radial portion of the wheel.

3. Process according to claim 1 which comprises molding bottom and central mold core parts so that the supporting radial portion of the cast wheel comprises a plurality of radial projections constituting spokes or fan blades.

* * * * *